Aug. 1, 1944.　　　　E. F. FISHER　　　　2,354,674
AIR AND GAS WASHER
Filed Nov. 27, 1940　　　　2 Sheets-Sheet 1

Ernest F. Fisher
INVENTOR.

Aug. 1, 1944.   E. F. FISHER   2,354,674
AIR AND GAS WASHER
Filed Nov. 27, 1940   2 Sheets-Sheet 2
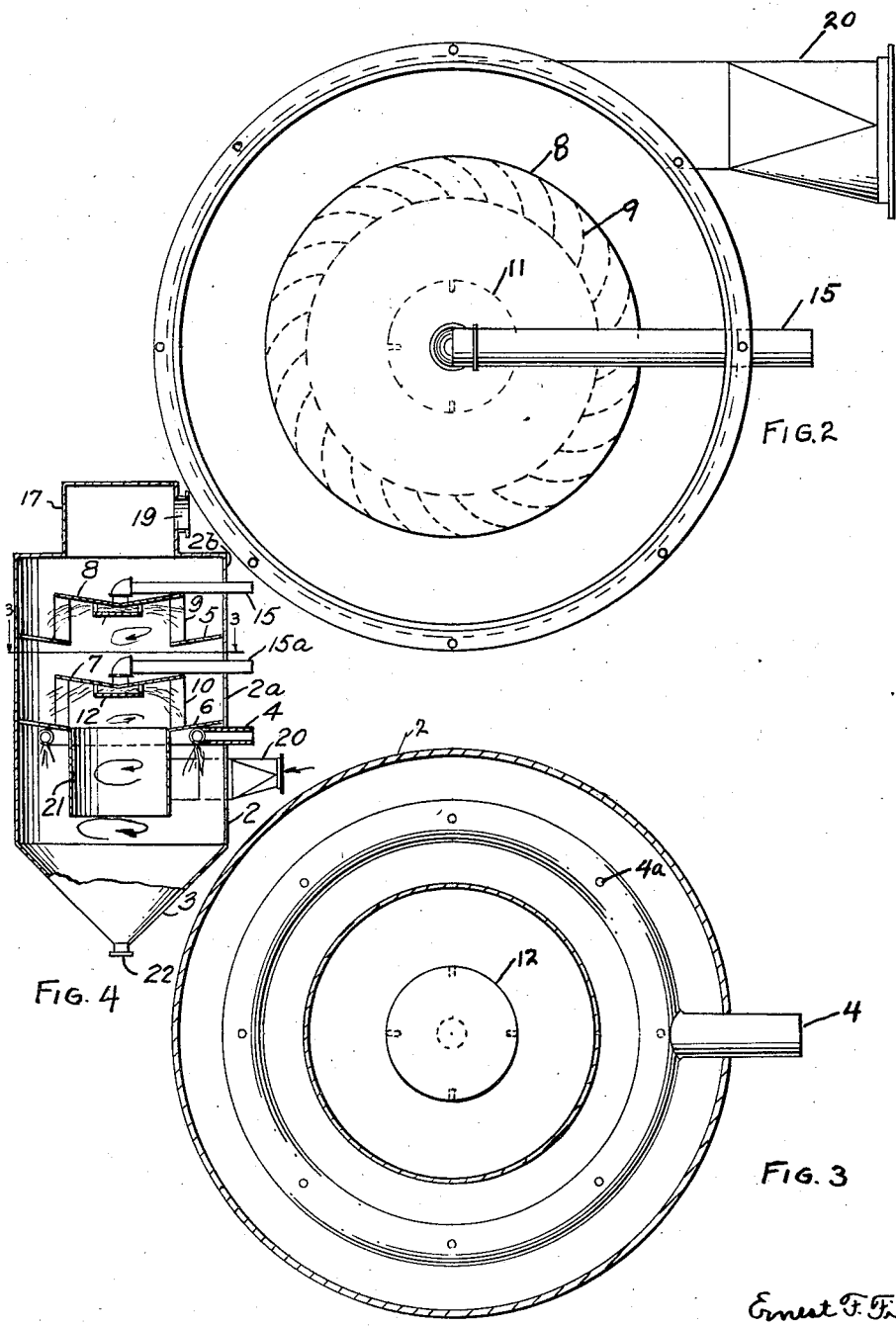
Ernest F. Fisher
INVENTOR.

Patented Aug. 1, 1944

2,354,674

UNITED STATES PATENT OFFICE 2,354,674

AIR AND GAS WASHER

Ernest F. Fisher, Passaic, N. J.

Application November 27, 1940, Serial No. 367,312

7 Claims. (Cl. 261—21)

This invention relates to improvements in air and gas washers and allied equipment such as scrubbing towers, contact columns, absorption towers and the like. One object of my invention is to provide efficient means for more perfect and simultaneous contact of the gases to be treated or cleaned and the contact liquid with impingement surfaces located in the path of the gases being treated and to accomplish this result with a minimum of resistance to the flow of gases through through the device.

Heretofore in air and gas washers and contact columns of the type wherein the gases to be treated or cleaned are made to swirl in a spiral path through a succession of swirl producing vanes located between baffle plates and disc baffles, the washing effect of the liquid has been gained mainly by passing the gas through a succession of cascades or water falls formed by the liquid falling off the edges of the baffle plates and disc baffles. Merely passing the air or gas through a water fall or cascade will not affect the air or gas materially except to remove the heavier fractions or dust particles because of the imperfect contact of the gas with the liquid. I have learned through costly experimentation that the gas to be treated, washed and cleaned must be impacted violently simultaneously with the contact liquid against suitable impingement surfaces properly positioned in the path of the gases.

In certain types of air and gas washer or contact column employing baffle plates and baffle discs wtih swirl producing vanes interposed therebetween, the vanes are not effective, their office being as their name indicates, merely swirl producing vanes. Great difficulty has been experienced with this type of washer because of its inherent defect due to the failure of the washing or contact liquid to effectively wet and thoroughly wash the surfaces of the swirl producing vanes. Due to this inability to effectually wet and wash these vanes, dust accumulates on these vanes to such an extent as to plug up the spaces between the vanes and to render the washer inoperative after prolonged use.

It was to correct these obvious defects that I have employed in my improved air and gas washer more effective means to impact the dust laden air and washing liquid simultaneously on the vanes and at a point where the highest angular velocity of the air and water obtains—right at the entrance of the swirl producing vanes and directly underneath the disc baffle, and therefore at the top of the vanes as well as at the middle and lower portions thereof. I also introduce this washing liquid in the direction of flow of the air so that all of this liquid is impacted against the vanes simultaneously with the air. None is by-passed; all the liquid must pass through the vanes with the air. This produces violent agitation and mixing of the air and liquid with direct impingement on the vanes.

Fig. 2 is a section on the line 2—2 of Fig. 1;

Fig. 3 is a section on the line 3—3 of Fig. 1;

Fig. 4 is a view similar to Fig. 1 showing a modification.

Figure 1:
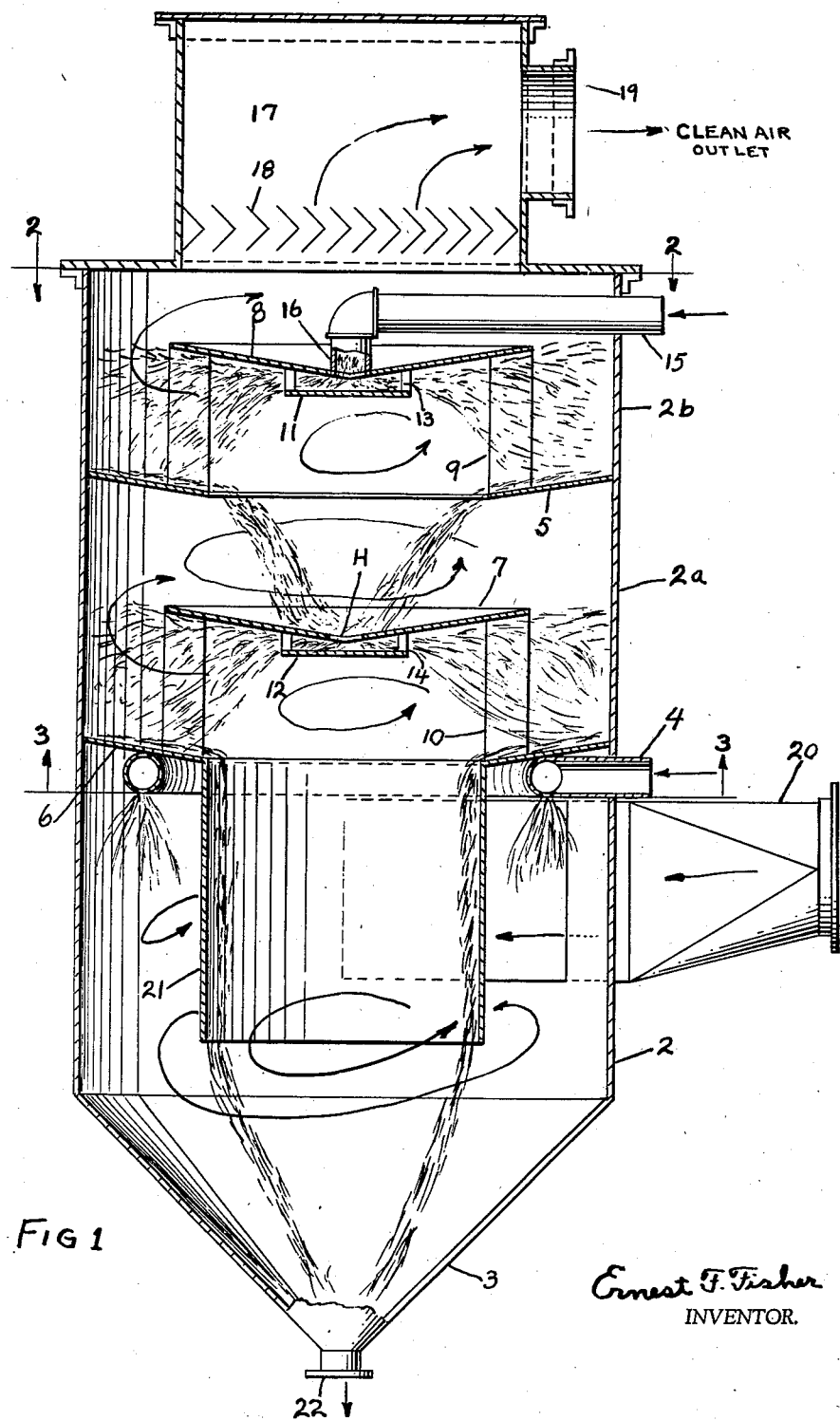
Fig. 1 is a vertical sectional view of my improved washer and contact column.

To obtain a clear idea of the operation of my improved air and gas washer, reference is made to Fig. 1. Dirty air or gases to be treated entering the primary chamber 2 through the tangential inlet 20 swirls around the outside of tube 21 meeting a spray of the washing liquid from supply pipe 4. The heavy dust is precipitated as sludge in chamber 2 and drains into conical bottom 3 and thence into outlet 22. The partially cleaned gas continues to swirl upward through tube 21 and because of the high angular velocity of the air swirl through this tube some of the remaining dust is thrown out by centrifugal force against the inside of tube 21 and is washed down by the downcoming liquid. This washing liquid enters the top of the washer in casing 2b through supply pipe 15. The air continues to swirl upward through vanes 10 interposed between the baffle ring 6 and disc baffle 7 carrying with it the liquid as it falls off edge of distributing or spreader disc 12 attached to underside of inverted conical disc baffle 7 by means of lugs 14. The distributing plates 11 and 12 have their peripheral edges spaced a substantial distance inwardly from the vanes 9 and 10 and are located respectively at the vortex of each of the cyclonic swirls indicated by the arrows directly below plates 11 and 12. The tangential air inlet 20 creates a cyclonic swirl on the inside as well as the outside of 21, as indicated by the arrows, and in the zone surrounded by the vanes 10, as indicated by the arrow below plate 12. The angular vanes 10 create a cyclonic swirl in the zone surrounded by the vanes 9, as indicated by the arrows below plate 11. The plates 11 and 12 each serve to confine liquid between itself and the disk baffle directly thereabove, and so serve to project liquid laterally into the cyclonic swirls indicated by the arrows just below the plates. This liquid is also projected into and through and over the entire surface of each of the vanes 9 and 10, keeping these vanes clear of dust that tends to accumulate thereon. Liquid is supplied to distributing disc 12 from inverted conical disc baffle 7 through drainage hole H in the center of disc baffle 7. This is the liquid that enters the top of the washer through supply pipe 15 which terminates in pipe 16. The spreader disc 11 which is attached to under side of the uppermost inverted conical disc baffle 8 by means of lugs 13 receives the liquid through pipe 16 which passes through the center of the conical baffle 8. As the air swirls upward through vanes 9 which are interposed between ring baffle 5 and inverted conical baffle 8, it carries with it the liquid that falls off of liquid distributing disc 11. The cleaned air continues upward through spray eliminators 18 into chamber 17 and thence out through clean air outlet 19. After passing through vanes 9 the liquid impinges on wall of casing 2b and then falls onto ring baffle 5 and thence flows to inverted conical disc baffle 7 from which it drains through hole H onto liquid distributing disc 12 thence against and across vanes 10 and against the inner wall of casing 2a and so on down to the final sludge outlet 22 as described.

Fig. 4 shows a slight modification where fresh washing liquid is supplied to the central drainage opening of each disk baffle. In this form of the invention, liquid is supplied to the upper disk baffle through the pipe 15 and to the whirling zone just outside the cylinder 21 by a pipe 4, all as in Fig. 1. Additional clean washing liquid is supplied to any intermediate disk baffles as by the pipe 15a.

Although this invention has been described in connection with details of specific embodiments thereof, it is not intended that such details shall be regarded as limitations upon the scope of the invention and where the words gas or air are used, it will be understood that such terms are to be used in their broad sense and include all vapors and gases as well as air.

I claim:

1. In an air cleaner, a vertically positioned casing, a disc baffle centrally positioned in said casing and spaced from the walls thereof, provided with a central liquid drainage opening, said disc baffle sloping downwardly and inwardly to said drainage opening, a baffle ring below the disc baffle and contacting the walls of the casing, the inner edge of the baffle ring defining a large central opening, vertically placed vanes positioned between the respective outer and inner portions of the disc baffle and the baffle ring, and a spreader plate positioned directly below said liquid drainage opening for laterally spreading downflowing liquid from said opening and directing it over said vanes and into the aircurrents flowing outwardly therethrough, means for supplying liquid above the disc baffle, and means for supplying impure air at the lower part of the casing.

2. In an air cleaner, a vertically positioned casing, a disc baffle centrally positioned in said casing and spaced from the walls thereof, and provided with a central liquid drainage opening, said disc baffle sloping downwardly and inwardly to said drainage opening, a baffle ring below the disc baffle and contacting the walls of the casing, the inner edge of the baffle ring defining a large central opening, the respective outer and inner edges of the disc baffle and baffle ring being in overlapping relationship, vertically placed swirling vanes positioned between the overlapping portions of the disc baffle and baffle ring, a spreader plate positioned directly below said liquid drainage opening for laterally spreading downflowing liquid from said opening and directing it over said swirling vanes and into the aircurrents flowing outwardly therethrough, means for supplying liquid above the disc baffle, and means for supplying impure air at the lower part of the casing.

3. In an air cleaner, a vertically positioned casing, a disc baffle centrally positioned in said casing and spaced from the walls thereof, and provided with a central liquid drainage opening, said disc baffle sloping downwardly and inwardly to said drainage opening, a baffle ring below the disc baffle and contacting the walls of the casing, the inner edge of the baffle ring defining a large central opening, vertically placed swirling vanes positioned between the respective outer and inner portions of the disc baffle and the baffle ring, a spreader plate positioned directly below said liquid drainage opening for laterally spreading downflowing liquid from said opening and directing it over said swirling vanes and into the aircurrents flowing outwardly therethrough, means for supplying liquid above the disc baffle, means for supplying impure air at the lower part of the casing, means, including a vertically-positioned open-ended cylinder in the bottom of the casing, for forming a tangential air inlet zone, and means for supplying a liquid spray in said air inlet zone.

4. In an air cleaner, a vertically positioned casing, a disc baffle centrally positioned in said casing and spaced from the walls thereof, and provided with a central liquid drainage opening, said disc baffle sloping downwardly and inwardly to said drainage opening, a baffle ring below the disc baffle and contacting the walls of the casing, the inner edge of the baffle ring defining a large central opening, said baffle ring sloping downwardly and inwardly for guiding liquid from the casing wall to its inner edge, over which it discharges into said large central opening, vertically placed vanes positioned between the respective outer and inner portions of the disc baffle and the baffle ring, a spreader plate positioned directly below said liquid drainage opening for laterally spreading downflowing liquid from said opening and directing it over said vanes and into the aircurrents flowing outwardly therethrough, means for supplying liquid above the disc baffle, and means for supplying impure air at the lower part of the casing.

5. An air cleaner, comprising a vertically positioned casing, an open ended cylinder vertically positioned in the lower part of said casing, a first ring baffle at the upper edge of said cylinder, defining, together with said cylinder, an annular swirling space, means for spraying liquid into said annular swirling space, a second ring baffle above the first ring baffle, disk baffles, provided with central liquid discharge apertures, positioned respectively above and below said second ring baffle, said disc baffles being larger than the openings in the ring baffles and overlapping them, angularly placed vanes positioned between the overlapping portions of each ring baffle, and the disc baffle just above it, a liquid spreader plate directly below the central liquid discharge aperture of each disc baffle, means for supplying liquid to the central aperture in the uppermost disc baffle, which liquid is collected by the second ring baffle and directed to the central aperture in the disc baffle below it, said spreader plates serving to direct liquid delivered from the central apertures in their respective baffles, into and through said angular vanes, the liquid from the first ring baffle passing into the upper end of said open ended cylinder.

6. An air cleaner comprising a vertically positioned casing, a ring baffle having its outer edge contacting the casing, a concentrically positioned solid disc baffle larger than the opening in the ring baffle so as to overlap the inner portion thereof and cover the opening in the ring baffle, vertically positioned angularly placed vanes between the overlapping portions of the solid disc baffle and ring baffle, a liquid spreading plate substantially smaller than the hole in the ring baffle and positioned directly below and concentric with the solid disc baffle for confining liquid between itself and the solid disc baffle and for directing liquid laterally into and over the entire surfaces of said angularly spaced vanes, and a conduit for supplying liquid to said concentric liquid spreading plate.

7. An air cleaner comprising a vertically positioned casing, a ring baffle having its outer edge contacting the casing, a concentrically positioned solid disc baffle larger than the opening in the ring baffle so as to overlap the inner portion thereof and cover completely the opening in the ring baffle, vertically positioned angularly placed vanes between the overlapping portions of the solid disc baffle and ring baffle, means for creating a cyclonic swirl in the zone surrounded by said angular vanes, a liquid spreading plate below the solid disc baffle and substantially smaller than the hole in the ring baffle and positioned in the vortex of said cyclonic swirl and serving to confine liquid between itself and the solid disc baffle and to project liquid into said swirl and into and over the entire surfaces of the angular vanes, and a conduit for supplying liquid to said liquid spreading plate.

ERNEST F. FISHER.